Aug. 22, 1967     J. CASTALDO     3,337,227
NESTING MERCHANDISE CART
Filed July 12, 1965     2 Sheets-Sheet 1
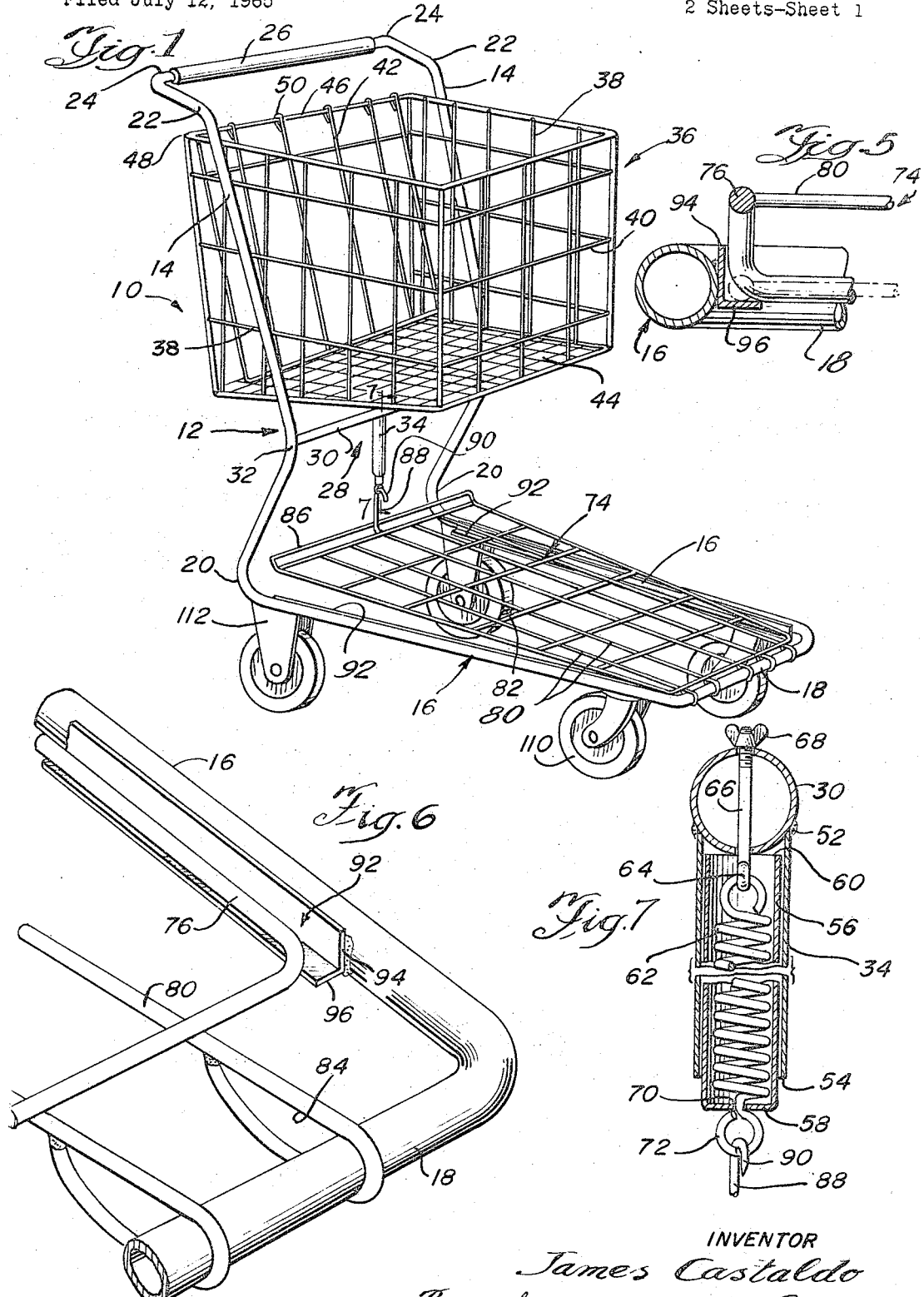
INVENTOR
James Castaldo
By Silverman & Cass
ATTORNEYS

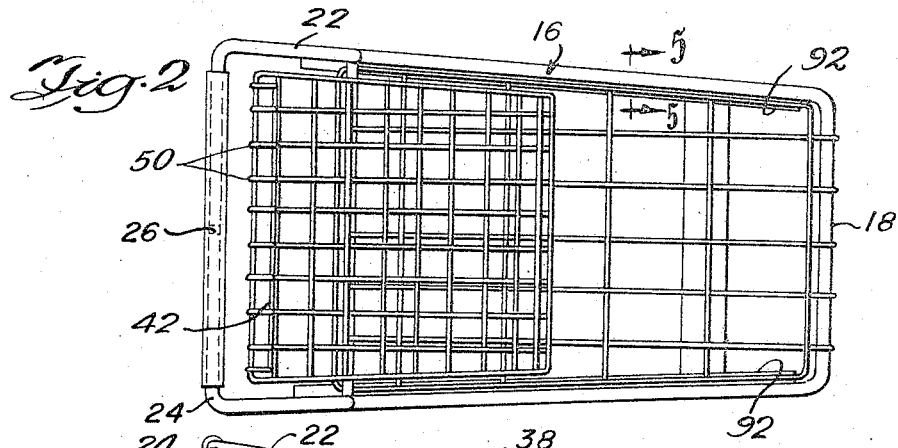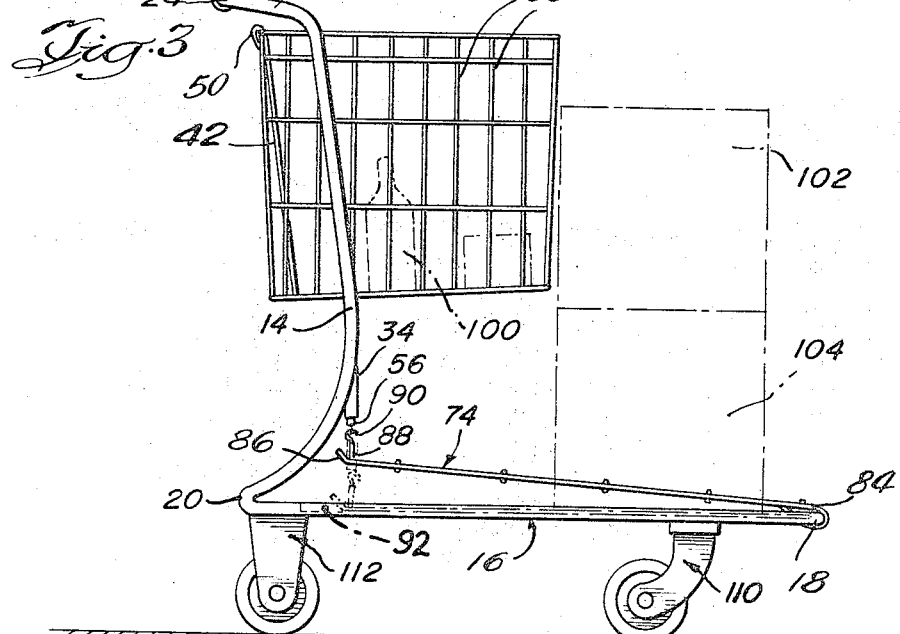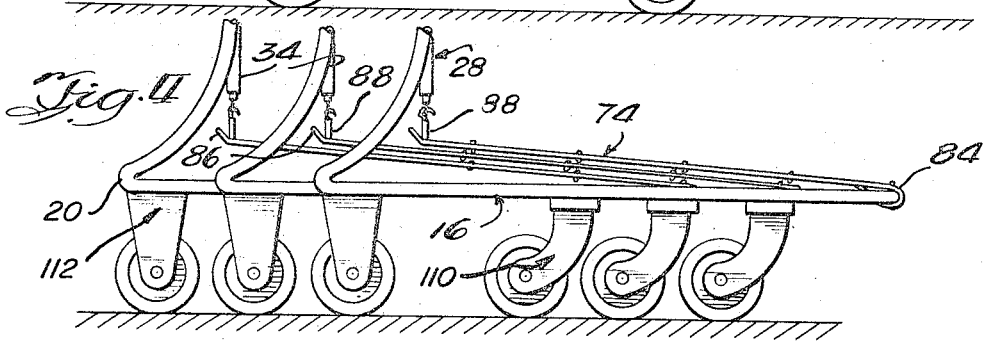

3,337,227
NESTING MERCHANDISE CART
James Castaldo, 1747 N. 73rd Ave.,
Elmwood Park, Ill. 60635
Filed July 12, 1965, Ser. No. 471,266
6 Claims. (Cl. 280—33.99)

ABSTRACT OF THE DISCLOSURE

A flat bed, nesting merchandise cart having a unitary frame which includes a pair of spaced vertical framing members having horizontally arranged bracing means between opposite ends thereof, the bracing means having a depending extension carrying spring means, a horizontally arranged tray hinged to the frame at one end and secured to said spring means at the other end thereof, the tray being biased to a normally inclined condition for nesting but assuming a flat bed condition under load, the merchandise cart further being characterized by the provision of a basket portion of length substantially less than the length of the tray so as to accommodate case lots of merchandise otherwise not capable of accommodation in a basket.

This invention relates generally to nesting merchandise carts and more particularly, to an improved nesting merchandise cart structure particularly adapted for use in self-service drug and/or liquor retail establishments, said improved cart being characterized by unusual economy of fabrication and strength and adaptability in use.

The use of nesting merchandise carts of the character with which this invention is concerned is well known. These carts are of a type generally provided with a basket and a lower tray so constructed and arranged to be telescopically engaged with like elements for storage thereof. Such carts are provided with a multi-unit frame structure including frame structure to which the basket is mounted and a bottom frame structure on which the lower tray is supported. Such frame structure generally is assembled by bolts, screws and the like fastening means. Generally the lower trays provided are inclined permanently as to facilitate nesting of the carts. Such inclination of the lower tray results in infrequent use thereof to support merchandise since articles would slide off the so inclined tray. So-called flat bed bottom tray constructions have been provided wherein the lower tray is hingedly connected at its forward end to the bottom frame and rests freely at its rearward end upon said frame. Thus, for nesting, the forward end of one cart can be forcibly urged past the rearward end of another cart, forcing the bottom tray from its rest position. These last mentioned structures usually provide extensions of the wire which forms the bottom tray. Such tray supported at its rearward end simply by, say, a pair of oppositely directed protruding rods resting upon the main bottom frame is not capable of supporting substantial weight.

Other structures heretofore proposed involve the provision of complicated or difficult to fabricate spring means at the forward end of the bottom tray in a type of cantilever arrangement so as normally to bias the bottom tray at an inclined position but to be capable of being forced against the normal bias by the weight of a package. These structures are expensive to fabricate and generally also require a multi-unit frame construction and hence are of considerable cost to the retailer. In recent times, theft or misappropriation of merchandise carts has become a considerable problem to the retailer, and hence the provision of a structure which is cheaper to fabricate and less expensive for the retailer, is quite desirable as a means for reducing the dollar loss suffered by the retailer in theft and/or misappropriation of merchandise carts. Also, these structures heretofore proposed are often damaged by the forcible urging of the carts into telescopic engagement for storage. Often this results in damage both to the hinged connection of the bottom tray, where used, and to the rear portion of said tray. Other disadvantages often encountered in the use of prior cart structures involve the lack of facile access to the selected merchandise loaded in the basket and on the lower tray thereof for ease during checking-out procedures.

In certain types of retail establishments, such as self-service liquor stores and drug stores, considerable additional disadvantages are encountered in the use of nesting type merchandise carts heretofore available due to the particular character of the merchandise purchased. For example, in self-service liquor stores it is common for purchasers to select individual bottled items and yet to select other merchandise packaged in large and relatively heavy case lots. Such selections are made by the purchaser during his traversal through the retail establishment, and hence must be, or should be, capable of being carried in the carts. Carts heretofore provided utilized baskets of a generally standardized size and configuration. These baskets are of a length equal to the length of the bottom tray so that there is adequate balance maintained for the cart, the distribution of weight of the empty cart being chosen so that the cart whether empty, partially full, or bearing unequal weights or loads at various locations thereon, nevertheless retains its stability. Because the basket is disposed over the entire bottom tray portion, the bottom tray portion is hardly capable of being used to support merchandise packaged in case lots. Generally the cases are of a height substantially greater than the open space between the bottom tray and the bottom wall of the basket. Therefore, in such merchandising carts provided by the prior art, the merchandise when packaged in case lots must be up-ended in order to fit within the basket, or if too large in breadth or bulk, must be balanced upon the top edges of the basket walls. This procedure not only renders the loaded basket somewhat unstable, but also prevents one purchaser from concurrently selecting and carrying both smaller, single bottled goods and the case lots of merchandise. In many instances, say, those where bottled mixes or carbonated beverages are selected, the cases are open-topped cases and hence the danger of breakage is a commonly encountered one. All of these disadvantages give rise to a desire to provide a nesting merchandise cart having all of the advantages of storage in a nested arrangement but yet is particularly adapted for use in such retail establishments as self-service liquor and drug stores where merchandise is selected both in smaller, individual packages and in large, bulky and relatively heavy cases.

Accordingly, the invention herein provides such an improved nesting type merchandise cart, constructed and arranged for carrying concurrently small individual packages and large bulky and relatively heavy cases of merchandise in stacks or otherwise.

Another object of this invention is to provide a nesting type merchandise cart having all the storage advantages heretofore available but which is of relatively simple construction, highly economical to fabricate, and yet capable of carrying substantial loads, particularly being adapted to carry loads of widely differing dimension.

Another object of this invention is to provide a nesting type merchandise cart which is characterized by a one-piece frame construction.

A further object of this invention is to provide a nesting type merchandise cart which includes a single piece frame construction having an upright portion and a bottom portion, a basket structure fixedly secured to said upright portion and a bottom tray hingedly secured at its forward end to the forward end of said bottom frame portion and spring biased at its rearward end to assume a normal inclined position to abet nesting but being movable to provide a flat bed bottom tray when a load is placed thereupon, the basket and the tray being characterized in that the basket has a length chosen to be substantially less than the length of the bottom ray so that merchandise of differing bulk can be carried by said cart, small items being carried in the basket and large items being carried in a stacked or other arrangement on the bottom tray.

A still further object of the invention is to provide in a nesting merchandise cart of the character last mentioned, simple yet strong means along the inner edge of the bottom framing portion which support means acts to transfer the force of the load placed upon the tray to the framing portion, therefore to equalize the overall effect of said load and prevent collapse of the bottom tray.

Still other objects and advantages of the invention will become evident to the skilled artisan as a description of a preferred embodiment thereof ensues hereinafter with reference to the accompanying drawings.

In the drawings:

FIG. 1 is a perspective view of a nesting-type merchandise cart constructed in accordance with the invention.

FIG. 2 is a plan view of the merchandise cart illustrated in FIG. 1.

FIG. 3 is an elevational view of the merchandise cart illustrated in FIG. 1 showing, in dotted outline, the cart is loaded condition.

FIG. 4 is a fragmentary elevational view of the lower portion of the cart illustrated in FIG. 1 shown in nested condition with other like carts.

FIG. 5 is a fragmentary enlarged section taken along line 5—5 of FIG. 2 and in the direction indicated, the dotted outline showing the position of the bottom tray element assumed when said tray is loaded.

FIG. 6 is an enlarged fragmentary perspective view of one front end corner of the cart illustrated in FIG. 1 but in loaded condition.

FIG. 7 is an enlarged fragmentary section taken along line 7—7 of FIG. 1 and in the direction indicated.

Referring now to FIG. 1, there is illustrated a nesting type merchandise cart embodying the invention generally designated by reference character 10. The cart 10 comprises a frame generally designated by reference character 12 formed of a single length of tubular material conformed to shape by methods well known in the art. The frame 12 has a pair of upright portions 14 and a U-shaped forwardly tapered bottom frame portion 16 having a forward end 18 and the legs thereof being integral with the bottom ends of upright portions 14 as shown at 20. Upright portions 14 are co-planar and are inclined rearwardly of forward end 18 so as to bow slightly between junctures 20 and the upper ends 22 of said upright portions. The upper ends 22 of said upright portions terminate rearwardly of juncture 20 and have right angular free ends 24 arranged to face one another. A bridging member 26 is secured to ends 24 so as to complete a handle for the cart. The upright portion 14 of frame 12 is braced between its respective ends 20 and 22 by a T-shaped brace 28 having the cross bar 30 thereof fixedly secured at opposite ends thereof to the respective members 14, as shown at 32. The vertical element 34 of the T-shaped brace 28 depends downwardly toward the bottom framing portion 16.

A basket member, generally indicated by reference character 36, is disposed within the area defined by the pair of upright portions 14 of frame 12, the cross bar 30 and handle 26. The basket 36 preferably is formed of a network of wire rod members arranged vertically and horizontally to constitute a pair of side walls 38, front wall 40, rear wall 42 and bottom wall 44. The front wall 40 of said basket is fixedly secured along respective edges of side walls 38 and likewise bottom wall 44 is fixedly secured to the respective side and front walls along the bottom edges thereof. Rear wall 42, however, is freely movable within the area bounded by said side walls 38, front wall 40 and bottom wall 44. Said rear wall 42 is hingedly secured to a brace bar 46 which is fixedly secured to the opposite upper edges of side walls 38, as shown at 48. The wires forming the wall 42 are looped over to form a hinged back connection between said rear wall 42 and the brace bar 46 as shown at 50.

The basket 36 is mounted fixedly to the frame along the respective side walls 38 by well known methods, such as welding, with a portion of the basket being disposed rearwardly of upright portions 14 but forwardly of a vertical plane occupied by the handle 26. The forward wall 40 is smaller in dimension than the rear wall 42 and hence the lower edges of the side walls 38 are inclined so that the bottom wall 44 is arranged in an inclined condition. The interior configuration of the basket is wedge-like, that is one wherein telescopic engagement of one basket into another through the rear wall thereof is permitted for a nested arrangement. The overall length of the basket, that is the distance between front and rear walls, is substantially less than the overall length of the bottom framing portion, that is the distance between bridging portion 18 to the rear portions 20. For this reason, the bottom framing portion and the lower tray 74 supported thereon extends forwardly of the front wall 40 of the basket for the purposes to be described hereinafter.

The depending vertical portion 34 of T-brace 28 is formed of a hollow tubular member functioning as a housing. One end of member 34 is fixedly secured to the cross bar 30 by means of a welded or like connection as shown at 52. The free end 54 of said vertical member 34 is open and a hollow housing member 56 is telescopically engaged within vertical member 34 through the free end 54 thereof. Housing 56 has a wall 58 closing off one end thereof and is open at its opposite end 60, the housing 56 being inserted within vertical member 34, open end 60 first. A looped-ended coil spring member 62 is disposed within said housing 56 and mounted upon the hook 64 of a bolt 66 mounted to cross bar 30 by means of a wing nut 68. A slot 70 is provided in wall 58 of housing 56 through which the other loop 72 of the spring 62 protrudes. A bottom rack 74 is arranged to bridge the U-shaped bottom frame portion of frame 12 and is of planar configuration conforming in planar configuration to that of the U-shaped bottom framing portion 16 of frame 12. The width of said rack 74 is selected to be only slightly less than the bridging width of the U-shaped bottom framing portion 16.

The bottom tray or rack 74 is formed of a peripheral portion or frame 76 across which is disposed an open wire network including longitudinal wires 80 and bridging wires 82. The perimetric configuration of tray 74 may desirably conform to the tapered outline of the bottom framing portion 16. These wires are mounted fixedly to the outer frame 76 of the tray. The length of the tray 74 is selected to be substantially equal to the length of the bottom framing portion 16 of frame 12. The longitudinal wires 80 extend outward of the frame 76 at the forward end thereof and are looped as shown at 84 over the forward bridging portion 18 of bottom framing portion 16, thereby to form a hinged connection so that the bottom tray 74 may be pivoted upon said forward bridging portion 18. The rear end 86 of the bottom tray 74 is free of connection to the frame. One of the longitudinal wires has an extension 88 integral therewith and disposed vertically relative said bottom tray 74 to terminate in a hook portion 90 which engages within the loop 72 of spring 62. The spring is selected to be of a tension such that the tray 74 is normally biased in an inclined plane relative to the bottom framing portion 16.

The hinged bottom tray 74, being made simply of a wire skeletal construction, would not be expected to support appreciable weight unless that weight were distributed over the bottom frame 16. This is simply and economically accomplished by tray support means comprising a right angle bracket 92 such as may be formed of an elongate length of angle stock. One leg 94 of the bracket 92 is secured by welding or the like procedures along the inner edges of bottom framing member 16 so that the other leg 96 of the bracket 92 provides a ledge for supporting the bottom tray 74 along frame 76. Thus, when a load is carried on the bottom tray 74, the weight is transmitted uniformly along the sturdier frame 16 and therefore the rack 74 does not buckle. The relative position of rack 74, both loaded and unloaded is shown diagrammatically in FIG. 5.

Referring to FIG. 3, the condition of the loaded cart is shown in dotted outline wherein the packages of small dimension, say, bottles 100, are illustrated disposed within the basket while the heavier, bulkier cases 102 and 104 are illustrated resting upon the lower tray with the tray assuming a flat bed arrangement resting upon the bracket 92. The spring 62 of course has been extended. The packages thusly are readily accessible for checking out purposes, and are readily visible for inspection during checking out procedures. Immediately upon removal of the cases 102 and 104, the spring 62 contracts to its normal condition carrying therewith the bottom tray to an inclined position. The nesting arrangement of one cart within the other is shown in FIG. 4 and particularly the arrangement of the bottom tray in a nested configuration with like elements.

Although not referred to above, a pair of front wheel assemblies 110 of well known configuration is mounted at the forward end of the bottom frame member 16 and a pair of rear wheel assemblies 112 is mounted to the frame adjacent the rear end portions of the bottom framing member 16 thereby to provide a dolly for support of the cart 10.

It is understood that the invention shown herein in a preferred embodiment may be modified and used in other embodiments without departing from the spirit and scope of this invention as defined in the appended claims.

I claim:

1. A nesting merchandise cart comprising, a unitary frame member having a substantially vertically arranged portion and a substantially horizontally arranged portion, a nestable upper package support means mounted on said vertically arranged portion and a lower package support means mounted on said horizontally arranged portion, said lower package support means comprising a tray hingedly connected to said horizontally arranged portion at its forward end and spring means disposed at the opposite end of said tray for biasing the tray to a normally inclined position relative to the horizontally arranged portion for nesting, said tray being movable against the bias of said spring to provide a flat bed support when a load is placed thereon, said vertically arranged portion comprising a pair of leg members arranged vertically coplanar, each leg member having a bowed portion between the ends thereof, one of said ends being respectively integral with the said horizontally arranged portion and brace means secured to said legs between opposite ends of said legs, said brace mean including a depending extension arranged between said legs and said spring means being carried by said depending extension.

2. The merchandise cart as claimed in claim 1 in which said upper package support has a length chosen to be substantially less than the length of said tray so that a portion of said tray extends forwardly of said upper package support to permit merchandise of differing bulk to be concurrently carried upon said cart, small items adapted to be carried in said upper support and large items adapted to be carried in a multilayer arrangement on said tray.

3. The merchandise cart as claimed in claim 1 and said tray having an upright member secured thereto at the rearward end thereof and connecting means for securing said member to said spring means.

4. The merchandise cart as claimed in claim 1 in which ledge-forming means is secured to said frame along the edges of said horizontally arranged portion thereof to provide support for the tray when a load is placed thereon.

5. The merchandise cart as claimed in claim 1 in which said tray is formed of a wire network of substantially planar configuration conforming in planar configuration to that of the horizontally arranged portion of said frame but being of dimensions chosen whereby to fit within the bounds of said frame, said tray having at least one wire thereof extending outward therefrom along that edge of the tray which is adjacent the forwardmost portion of the frame, said extenled wire being looped over the said frame to form the hinged connection for the tray.

6. The merchandise cart as claimed in claim 1 in which said upright portions of the frame terminate in an angular formation extending rearwardly of said cart and adapted to be connected to form a handle for said cart.

References Cited

UNITED STATES PATENTS

| | | | |
|---|---|---|---|
| 2,639,161 | 5/1953 | Goldman | 280—33.99 |
| 2,764,419 | 9/1956 | Enders | 280—33.99 |
| 2,903,269 | 9/1959 | Hennion | 280—33.9 |
| 3,078,102 | 2/1963 | Sides | 280—33.99 |
| 3,157,871 | 11/1964 | Umanoff | 280—33.99 XR |

FOREIGN PATENTS

| | | |
|---|---|---|
| 1,194,860 | 5/1959 | France. |
| 1,308,021 | 9/1962 | France. |
| 1,323,689 | 4/1963 | France. |

BENJAMIN HERSH, *Primary Examiner.*

MILTON L. SMITH, *Assistant Examiner.*